United States Patent [19]

Yu

[11] 4,305,243
[45] Dec. 15, 1981

[54] ANTI-INSECT NET DEVICE

[76] Inventor: Nam S. Yu, 522 Grand St., Brooklyn, N.Y. 11211

[21] Appl. No.: 216,825

[22] Filed: Dec. 15, 1980

[51] Int. Cl.³ .............................................. B68C 5/00
[52] U.S. Cl. ....................................................... 54/81
[58] Field of Search .................... 54/24, 75, 79, 80, 81; 119/143, 156

[56] References Cited

U.S. PATENT DOCUMENTS

| | | | |
|---|---|---|---|
| 419,901 | 1/1890 | Wagner | 54/81 |
| 640,632 | 1/1900 | Cooper | 54/81 |
| 1,497,351 | 6/1924 | Swenson | 54/81 X |

FOREIGN PATENT DOCUMENTS 341028  7/1904  France ..................................... 54/79

*Primary Examiner*—Gene Mancene
*Assistant Examiner*—Robert P. Swiatek
*Attorney, Agent, or Firm*—Richard L. Miller

[57] ABSTRACT

A net for protecting an animal against flies, insects, and the like is provided, with the net being attached to the animal by means of a flexible main plate with holes which receives therethrough an affixing plate having a plurality of rounded extensions insertable through the holes. The net is clamped in place upon the main plate by a closure plate receiving the rounded extensions therein in locking fashion. The main plate has a plurality of fingers extending from each side edge for abutment against the skin of the animal in order to space the net from the skin of the animal.

10 Claims, 6 Drawing Figures

ANTI-INSECT NET DEVICE

BACKGROUND OF THE INVENTION

It is well known that numerous losses occur each year due to flies, vermin, insects, and the like attacking the skin of cattle, sheep, and other animals. Hitherto, toxic drugs have been used to coat the skin of the animals, which however have caused irritation to the skin, and have in some cases affected the milk production of cows. Further, the use of such toxic chemicals has had ill effects in the food chain with adverse effects having been noted among humans drinking the milk of such animals or the eating the meat therefrom.

It has also been a problem that cattle and horses are prone to lie upon their own feces, causing discomfort to them as well as providing further danger from insects attracted to the feces. Bathing has also been hampered by such excrement and urine upon the skin of the animals.

SUMMARY OF THE INVENTION

It is, therefore, the primary object of the present invention to provide an anti-insect device that will overcome the above-mentioned shortcomings of currently used techniques of preventing insect damage to animals. To this end, a net is used which effectively prevents the attacking insects from reaching the skin of the animal. The net itself is spaced from the skin of the animal so that the animal will feel as little discomfort as possible. The net is spaced from the skin by a flexible main plate having a plurality of fingers projecting from the side edges. The fingers abut against the skin to thereby space the net therefrom and to allow for as little surface area as possible from resting against the animal. The net is attached to the main plate by an affixing plate having a plurality of rounded extensions that pass through a plurality of holes formed in the main plate and through the net itself. The net is clamped in place upon the main plate by a closure plate having a plurality of holes corresponding to the rounded extensions, which rounded extensions are received through these holes in clamping fashion.

The main plate, affixing plate, and closure plate are all made of a soft resin material to allow for increased flexibility to thereby ease any discomfort felt by the animal by the device of the present invention.

In a modified form of the invention, the main plate has an alternating series of hump portions and level portions, with corresponding hump portions and level portions on the affixing and closure plates. The hump portions of each mesh together for a tight fit. This form of the invention has special use along those areas of the animal that receive greater stress, such as the leg portions and neck. In use, the present invention may utilize both forms of the invention and additional modifications thereof to define the main plate and the other plates to the contour of the particular surface area of the animal to which the net is being attached.

BRIEF DESCRIPTION OF THE DRAWING

The invention will be more readily understood with reference to the accompanying drawing, wherein.

DETAILED DESCRIPTION OF THE INVENTION

Figure 1:
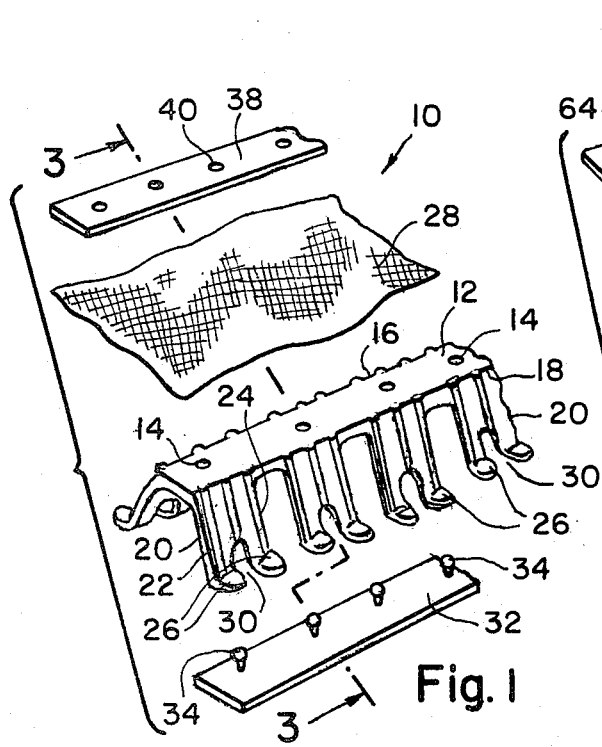
FIG. 1 is an exploded perspective view of anti-insect net device of the present invention.

Referring now to the drawing, the anti-insect net device 10 of the present invention is shown in FIG. 1. the anti-insect net device 10 has a main plate 12 of rectangular configuration with a plurality of holes 14 formed therethrough along the top face. Projecting from the two side edges 16 and 18 are a plurality of fingers 20, four such fingers being shown extending from each side edge 16, 18. Each finger 20 is made of two finger portions 22, 24 terminating in an outward projection 26. The fingers 20 rest against the surface skin of the animal upon which the anti-insect net device of the invention is placed, so that a net 28 is spaced therefrom. The projections 26 of each finger are spaced from each other to define therebetween an opening 30 to provide greater flexibility of the fingers so that greater comfort is provided for the animal. The main plate and the fingers are made of a soft resin to provide even greater flexiblity and comfort.

An affixing plate 32, also made of a soft resin, is provided which is of rectangular configuration similar to that of the main plate 12. The affixing plate 32 has a plurality of rounded extensions 34 corresponding to the plurality of holes 14 formed in the main plate. The rounded extensions are insertable through the holes 14 for subsequent attachment of the net 28 by a closure plate 38. The closure plate 38 is provided with a plurality of holes 40 corresponding to the holes 14 of the main plate 12 and the rounded extensions 34 of the affixing plate 32.

Figure 3:
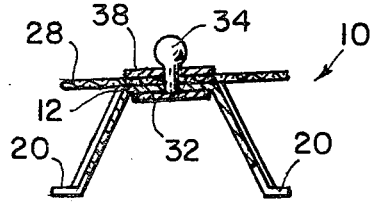
FIG. 3 is an end view of the invention shown in FIG. 1.

To attach the net 28 to the main plate 12, the rounded extensions 34 are pushed through the holes 14 of the main plate and through the net 28 itself, and the net 28 is locked in place by the closure plate 38 via the holes 40 thereof receiving therein the rounded extensions 34, as can be seen best in FIG. 3. The round knob of the rounded extension 34 lies above the plane of the top surface of the closure plate 38 as can be seen in FIG. 3.

Figure 2:
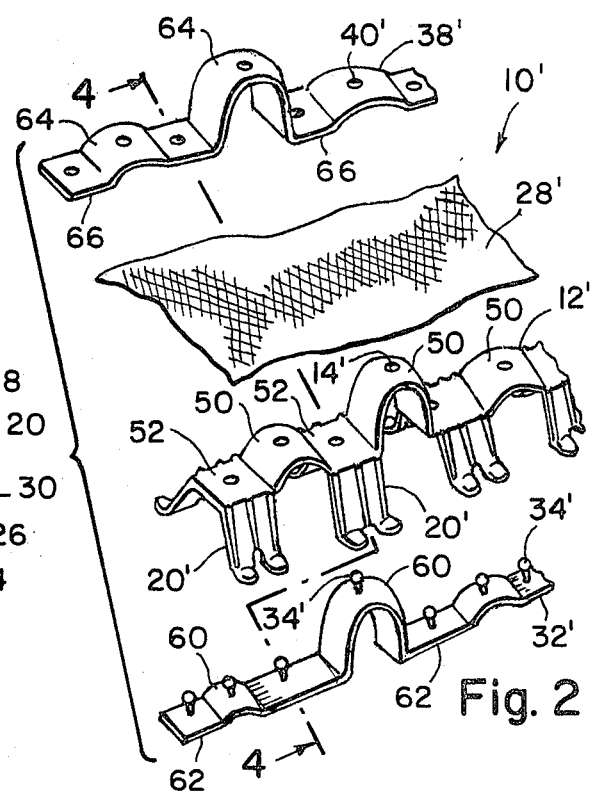
FIG. 2 is a similar view of a modified form of the invention.
Figure 4:
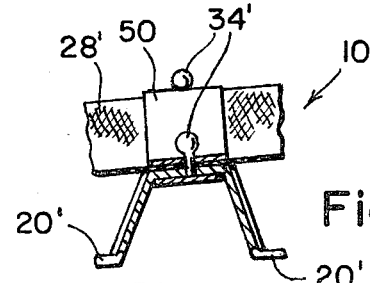
FIG. 4 is an end view of the modified form of the invention shown in FIG. 2.

In a modified form of the invention shown in FIGS. 2 and 4, the main plate 12' of the invention 10' is provided with hump portions 50 alternating with level portions 52, with the holes 14' being formed alternately in the hump portions and level portions, as can be seen in FIG. 2. Likewise, the affixing plate 32' is provided with hump portions 60 and level portions 62, in alternating fashion, with the rounded extensions 34' projecting from both. The closure plate 38' also has hump portions 64 and level portions 66. The hump portions and level portions of all of the plates correspond to each other so that the three plates may be connected together in a compact fashion, as shown in FIG. 4. The provision of the hump portions in each of the plates provides a surer fastening of the net when at those locations along the skin surface of the animal that provide the greater stress, such as the legs and neck area. The hump connection distributes the stress along a greater area and accepts greater moments about the ends thereof.

Figure 5:
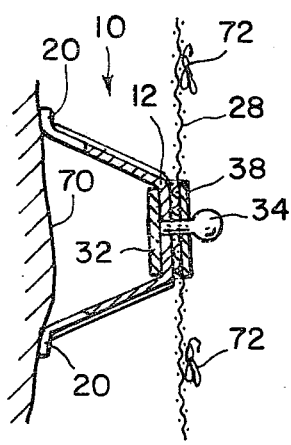
FIG. 5 is a cross-sectional view of the invention shown in FIG. 1 in use.
Figure 6:
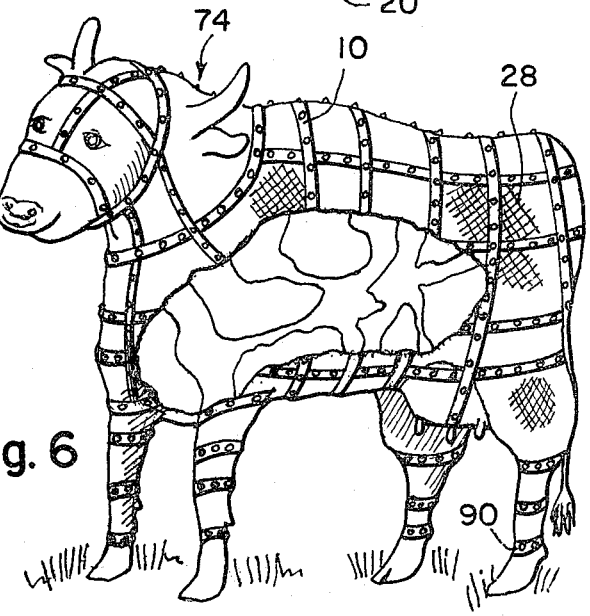
FIG. 6 shows an animal enmeshed by the anti-insect net device of the invention.

The anti-insect net device of the present invention is shown mounted upon an animal in FIGS. 5 and 6. In FIG. 5, the first embodiment of the invention 10 is shown with the fingers 20 resting against the skin surface 70 of the animal, with the net 28 preventing access to the animal by, for example, a fly 72.

In FIG. 6, the animal 74 is shown clad with the anti-insect net device. In such an arrangement, use is made of both forms 10 and 10', as mentioned above, with the modified form being utilized around the areas subject to greater stress and movement. As can also be seen in FIG. 6, along those areas where there is not enough surface skin for the utilization of four fingers and holes, a lesser number may be used. Also, the main plate 12 or 12' may be curved to conform to the particular location upon which it will rest, as indicated by 90 in FIG. 6.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An anti-insect net device for cattle and the like comprising a main plate made of a flexible material, said main plate having formed therethrough along the length thereof a plurality of holes, and a plurality of fingers extending from the side edges of said main plate, each of said plurality of fingers having at the end thereof remote from a respective side edge of said main plate a projection for bearing against the skin of the animal; an affixing plate of equal dimensions as said main plate comprising a plurality of rounded extensions for insertion through said plurality of holes formed in said main plate, said affixing plate also being made of a flexible material; a closure plate also having approximately the same dimensions as said main plate and having a plurality of holes formed therethrough corresponding with the plurality of holes formed through said main plate, said closure plate also being made of a flexible material; and a net clamped in place between said closure plate and said main plate on the side remote from the fingers by said rounded extensions of said affixing plate when said rounded extensions are inserted through the plurality of holes of said main plate and said closure plate, whereby protection against vermin, insects, and the like is provided for cattle, and the like.

2. The anti-insect net device according to claim 1, wherein said main plate is of rectangular configuration and said fingers project away from the side thereof having the greater length.

3. The anti-insect net device according to claim 2, wherein there are four of said plurality of holes formed in said main plate, and there are four of said fingers projecting from each of said sides of said main plate having the greater length.

4. The anti-insect net device according to claim 3, wherein said closure plate and said affixing plate are also of rectangular configuration, said affixing plate having four of said rounded extensions and said closure plate having four of said holes formed therethrough.

5. The anti-insect net device according to claim 2, wherein each of said fingers of said main plate diverges away from said respective side edge so that said projection of the respective finger is at a greater horizontal distance from the respective side edge than the part of the finger directly connected to said side edge.

6. The anti-insect net device according to claim 5, wherein each of said plurality of fingers extends from said respective side edge at a location along said main plate adjacent to one of said plurality of holes formed through said main plate.

7. The anti-insect net device according to claim 6, wherein each of said plurality of fingers comprises a first finger extension, a second finger extension integrally molded with said first finger extension, a first projection portion extending from the end of said first finger extension, and a second projection portion extending from the end of said second finger extension, said first and second projection portions constituting said projection of said finger, said first and second finger extensions being connected along a portion of the length thereof so as to define an opening therebetween near said first and second projection portions, said first and second projection portions being separated from each other and defining therebetween an opening corresponding with the opening formed between said first and second finger extensions.

8. The anti-insect net device according to claim 1, wherein said main plate comprises a plurality of humps spaced along the length thereof and a plurality of level portions alternating with said humps, said plurality of holes of said main plate being formed alternately in said humps and said level portions.

9. The anti-insect net device according to claim 8, wherein said affixing plate also comprises a plurality of humps and a plurality of level portions alternating with said plurality of humps, said rounded projections projecting from said humps and said level portions in an alternating manner, said humps of said affixing plate corresponding to said humps of said main plate and said level portions of said affixing plate corresponding to the level portions of said main plate for abutment thereagainst.

10. The anti-insect net device according to claim 1, comprising a plurality of said main plates, a plurality of said affixing plates, and a plurality of said closure plates, said fingers of one of said main plates resting on the skin of the animal at a location different from the fingers of another one of said plurality of main plates.

* * * * *